United States Patent

[11] 3,603,974

[72] Inventor Jesse T. Copeland, Jr.
 Cape Canaveral, Fla.
[21] Appl. No. 889,556
[22] Filed Dec. 31, 1969
[45] Patented Sept. 7, 1971
[73] Assignee The United States of America as represented by the Administrator of the National Aeronautics and Space Administration

[54] HIGH SPEED PHOTO-OPTICAL TIME RECORDING
 4 Claims, 3 Drawing Figs.
[52] U.S. Cl. .................................................. 346/23,
 346/107 A, 307/311, 352/84, 95/1.1
[51] Int. Cl. ....................................................... G03b 17/24

[50] Field of Search........................................... 346/107,
 107 A, 20, 23; 352/84; 313/108 D, 108 A, 108 B;
 307/311, 312, 313; 95/1.1

[56] References Cited
 UNITED STATES PATENTS
 3,354,342 11/1967 Ohntrup et al............... 313/108
 3,375,526 3/1968 Finlay........................... 346/44
 3,508,015 4/1970 Miller et al. .................. 179/100.3

Primary Examiner—Joseph W. Hartary
Attorneys—James O. Harrell and G. T. McCoy

ABSTRACT: An apparatus for placing a permanent time record on photographic film while being used in a high speed movie camera so as to indicate the exact time each frame of film is exposed. A coded source of timing pulses is fed into an electronic circuit that includes an electroluminescent diode that generates light signals corresponding to the timing pulses. These light signals are placed on the film in the camera.

PATENTED SEP 7 1971

3,603,974

INVENTOR.
JESSE T. COPELAND, JR.

BY James O. Harrell
Hume Coy
ATTORNEYS.

HIGH SPEED PHOTO-OPTICAL TIME RECORDING

This invention described herein was made by an employee of the United States Government, and may be manufactured and used by or for the Government for Governmental purposes without the payment of any royalties thereon or therefor.

The invention relates to an improved photo-optical recording apparatus, and more particularly to a photo-optical recording system which incorporates an electroluminescent diode that generates coded light pulses that are recorded on high speed film.

Heretofore, in order to place coded time signals on film as it is run in a camera, coded light signals corresponding to timing coded electrical pulses were produced adjacent the film being run to expose the code thereon. The light signals were generally generated by a gaseous neon discharge glowlamp which operated satisfactorily when the film was being run at a relatively slow speed. These lamps, however, were never intended, and cannot reasonably be expected to meet the present system requirements demanded in high speed photographic operations. The basic physics of the glow discharge lamp operation, including ionization times, maximum current capabilities, and electrode degradation due to ion bombardment dictates its inadequate performance. As a result of the physical limitations inherent in operating a neon glowlamp, there has frequently been a loss of timing code record on launch film.

It is desired to provide a photo-optical system which is capable of producing light pulses for recording a timing code on film for a wide range of film and camera speeds, for example, between 1 frame per second to 2,000 frames per second, but not limited thereto. In order to do such, the unit must optically reproduce electronic pulses ranging in width from 100 microseconds to 80 milliseconds, with repetition rates ranging from 10 pulses per second to 1,000 pulses per second.

In accordance with the present invention, it has been found that difficulties encountered with photo-optical time recording systems may be overcome by providing a novel apparatus for placing a permanent time record on photographic file while being used in a high speed movie camera so as to indicate the exact time each frame of the film is exposed. The apparatus includes the following basic parts: (1) A coded source of timing pulses indicating the time of a particular day, (2) an electronic circuit provided for receiving and amplifying the timing pulses, (3) an electroluminescent diode having a slit therein for emitting light therefrom when energized, (4) the electroluminescent diode being interposed in the circuit for being energized by the timing pulses and generating pulses of light corresponding to the timing pulses, and (5) the electroluminescent diode being carried in the movie camera closely adjacent the path of the film so that pulses of light being emitted from the electroluminescent diode expose a time code on the film as the film is run in the camera.

Accordingly, it is an important object of the present invention to provide an apparatus which produces a timing code on the film being run through the movie camera at a high speed to indicate the exact time each frame has been exposed.

Another important object of the present invention is to provide a simple and effective means of producing coded light signals which are to be recorded on film in a movie camera.

Still another important object of the present invention is to provide an efficient and compact circuit which can be mounted within a movie camera closely adjacent the film exposing a timing code thereon.

Other objects and advantages of this invention will become more apparent from a reading of the following detailed description and appended claims taken in conjunction with the accompanying drawing wherein:

Figure 3:
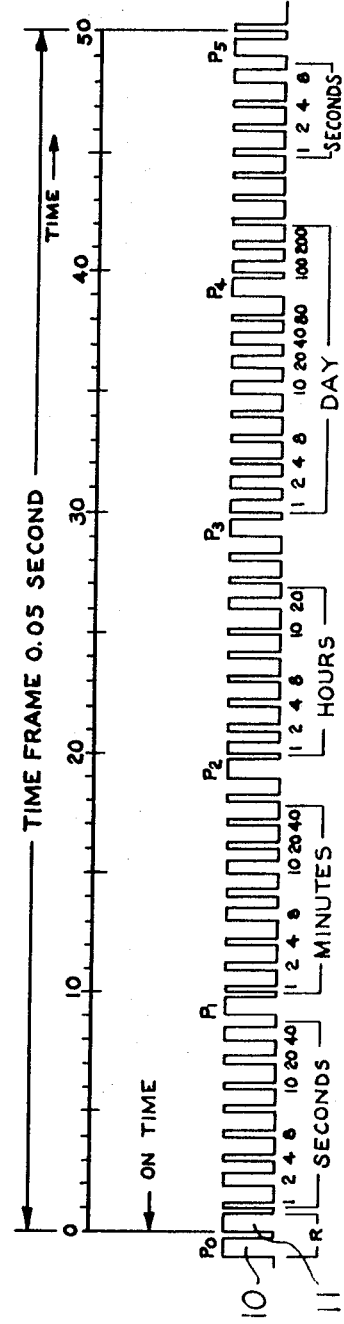
FIG. 3 is a schematic representation of the timing code that is exposed in the film by the electroluminescent diode.

Referring in more detail to the drawing, FIG. 3 of which shows a portion of a standard time frame which may be provided by any suitable conventional source which generally repeats itself every tenth of a second. Referring to the frame, it can be seen that the first two electrical pulses 10 and 11 are reference markers. The next group of pulses between the reference markers 10 and 11 and pulse $P_1$ indicate seconds in binary form. The next group of pulses between position identifier pulse $P_1$ and $P_2$ indicates minutes in binary form. The next group of pulses between position identifier pulse $P_2$ and $P_3$ indicate hours, as indicated. The next group of pulses between position identifier pulse $P_3$ and $P_4$ indicate the time of day, as indicated by the indicia within the brackets, and the bracketed group of pulses coming after the bracket group of pulses identifying the day are for identifying tenths of seconds. Only one-half of the total time frame is illustrated since such binary coded pulses in a time format is in a conventional standard practice.

In order to record and convert the pulses illustrated in FIG. 3 into light pulses and electroluminescent diode 12 is serially energized by timing pulses, such as indicated in FIG. 3 to generate the light pulses. These light pulses, in turn, expose the edge of the film running through the camera impressing the serial timing code thereon. Any suitable conventional electroluminescent diode may be used in the circuit. One suitable diode is a (hexagonal) silicon carbide, an inert refractory semiconductor, having a band gap of 2.86 electron volts. Visible light in the yellow wavelength region, between 4,500 and 7,000 angstrom units, is generated by injection electroluminescence due to impurity transition in the indirect band gap material. Junctions are formed in the silicon carbide at temperatures in excess of 1,500° C. The silicon carbide diode has a greater thermostability than most semiconductors. Therefore, the diode is suitable for use at high temperatures.

The exposed junction of the diode 12 emits light from a slit-shaped area approximately 0.040 inch in length and 0.002 inch in width. The diode package can thus be mounted directly adjacent the film running in the camera and requires no intervening optics. It is to be understood that other suitable conventional electroluminescent diodes can be utilized.

Figure 1:
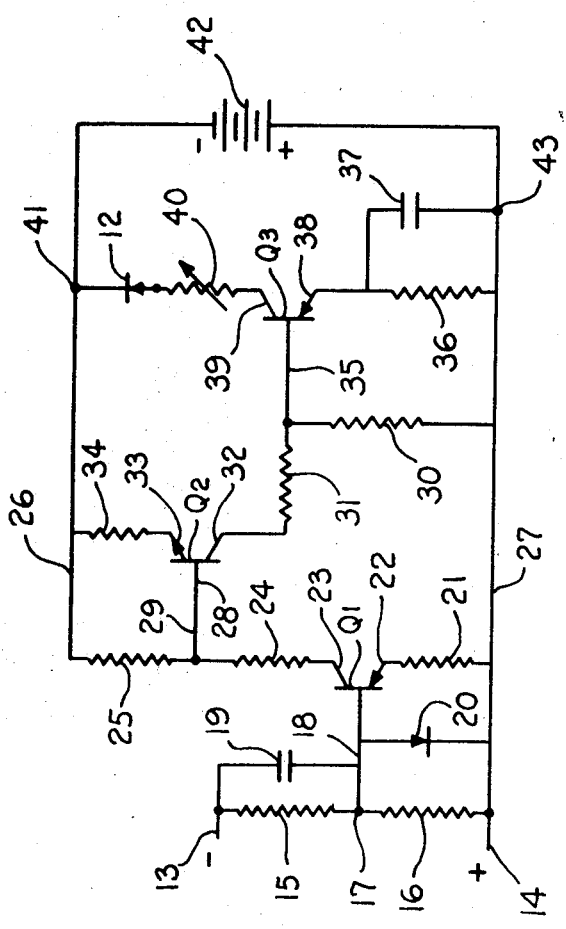
FIG. 1 is a schematic diagram showing the circuit for driving the electroluminescent diode at a coded frequency.

Operation of such electroluminescent diodes require a low diode driving voltage and pulse currents of an order of magnitude higher than is available directly from most conventional coded sources of timing pulses. Therefore, the three-stage switching amplifier circuit illustrated in FIG. 1 is provided for amplifying the coded timing pulses.

The three-stage switching amplifier receives signals in the form of a pulse code, such as illustrated in FIG. 3, from any conventional source and applies such across leads 13 and 14. A voltage divider circuit, which includes resistors 15 and 16, is connected between the leads 13 and 14. An intermediate junction 17 is connected to a base electrode of a first stage PNP transistor Q1. A capacitor 19 is coupled between lead 13 and the intermediate lead 18 for maintaining a short pulse rise time on the incoming pulses. The diode 20 is connected between lead 18 and lead 14 to protect the circuit in case the wrong polarity pulses are applied to the base electrode of transistor Q1.

When the appropriate pulse is applied to the base electrode of transistor Q1, it turns on transistor Q1 allowing current to flow through resistor 21, emitter electrode 22, out collector electrode 23, resistor 24, resistor 25, to lead 26. The lower side of resistor 21 is connected to lead 27. The first stage of the apparatus which includes transistor Q1 operates as a low power class A amplifier, providing negligible loading of the driver circuit. The second stage, which includes transistor Q2, operates at saturation providing stability to the circuit.

When Q1 turns on, a pulse is applied to the base electrode 28 over lead 29 of NPN transistor Q2. This allows transistor Q2 to turn on, permitting current to flow through resistor 30, resistor 31, collector electrode 32, emitter electrode 33, and resistor 34. The voltage developed across resistor 30, in turn, is applied to the base electrode 35 of transistor Q3 turning on the transistor. When transistor Q3 turns on, current flows through the RC network, which includes resistor 36 and capacitor 37, to the emitter electrode 38, and out the collector electrode 39, through variable resistor 40 and electroluminescent diode 12, to junction 41 interposed in lead 26. The pulse passing through electroluminescent diode 12 causes the diode to generate a light pulse of the same duration as the pulses applied to the input on the apparatus across leads 13 and 14.

Figure 2:
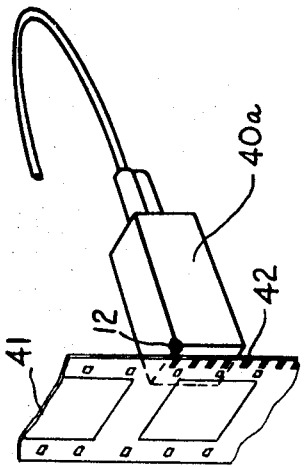
FIG. 2 is a perspective view illustrating the electroluminescent diode exposing the timing code on the edge of a piece of film as it runs through a camera.

As previously mentioned, the electroluminescent diode is carried within the movie camera on an aluminum timing block 40a, which acts as a heat sink, directly adjacent the film running therethrough. As shown in FIG. 2, the edge of a piece of film 41 is exposed with the serial timing code, represented by the reference numeral 42, as the film passes in front of the electroluminescent diode 12. The diode 12 is mounted so that the film passes approximately 0.002 to 0.003 inch from the light emitting surface of the diode.

Power for the circuit is provided by the DC source 42 connected between junction 41 and junction 43 interposed in lead 27. The RC network, which includes resistors 36 and capacitors 37 is provided for tuning the emitter collector circuit of transistor Q3 in order to compensate for the inductive impedance of the diode 12. The load resistor 40, is a combination of an appropriate fixed resistance and a 1-watt variable resistor in series to provide the desired pulse current range for the diode.

In summary, the apparatus provides coded light pulses which are identical in width to incoming conventional timing coded pulses, and are used for exposing a coded track on a film running in a camera. Since the diode can be operated at extremely high speeds, the exact time for each frame of the film running through the camera can be determined.

I claim:

1. An apparatus for placing a permanent time record on photographic film while being used in a high speed movie camera so as to indicate the exact time each frame of the film is exposed comprising:
   A. A coded source of serial timing pulses having variable widths representing the time of a particular day,
   B. an electronic circuit provided for receiving and amplifying said timing pulses,
   C. an electroluminescent diode having a slit therein for emitting light therefrom when energized,
   D. said electroluminescent diode being interposed in said circuit for being serially energized by said timing pulses and generating pulses of light corresponding to said variable widths of said timing pulses, and
   E. said electroluminescent diode being carried in said movie camera closely adjacent the path of said film so that as said film runs in said camera, said electroluminescent diode emits pulses of light to expose a serial timing code represented by exposed film widths identical to said variable widths of said timing pulses.

2. The apparatus as set forth in claim 5, wherein said electroluminescent diode is mounted on a heat sink for aiding in dissipating heat generated during the operation of said diode.

3. The apparatus as set forth in claim 5, wherein said electronic circuit includes,
   A. a solid state three-stage switching amplifier,
   B. said timing pulses being coupled to an input of the first stage of said three-stage switching amplifier, and
   C. said electroluminescent diode being coupled to said third stage of said three-stage switching amplifier.

4. The apparatus as set forth in claim 3, wherein said third stage of said three stage switching amplifier includes,
   A. a power transistor having an emitter, collector, and base electrode,
   B. said electroluminescent diode being connected to a circuit containing said emitter and collector of said power transistor, and
   C. an RC network coupled to said circuit containing said emitter and collector electrodes for tuning said circuit to compensate for the inductive impedance of said electroluminescent diode.